US012665181B2

(12) United States Patent    (10) Patent No.:  US 12,665,181 B2
Iso et al.    (45) Date of Patent:     Jun. 23, 2026

(54) IONIZER

(71) Applicant: SHIMADZU CORPORATION, Kyoto (JP)

(72) Inventors: Keisuke Iso, Kyoto (JP); Yuki Tanaka, Kyoto (JP); Fumihiko Hirata, Kyoto (JP); Shingo Fujioka, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 310 days.

(21) Appl. No.: 18/686,152

(22) PCT Filed: Aug. 24, 2021

(86) PCT No.: PCT/JP2021/030953
§ 371 (c)(1),
(2) Date: Feb. 23, 2024

(87) PCT Pub. No.: WO2023/026355
PCT Pub. Date: Mar. 2, 2023

(65) Prior Publication Data
US 2024/0379339 A1    Nov. 14, 2024

(51) Int. Cl.
H01J 49/16    (2006.01)
G01N 30/72    (2006.01)
H01J 49/04    (2006.01)
(52) U.S. Cl.
CPC ........ H01J 49/167 (2013.01); G01N 30/7266 (2013.01); H01J 49/044 (2013.01)
(58) Field of Classification Search
CPC ... H01J 49/167; H01J 49/044; G01N 30/7266
See application file for complete search history.

(56) References Cited

U.S. PATENT DOCUMENTS 5,412,208 A * 5/1995 Covey ................ G01N 30/7246
                                                    250/281
6,759,650 B2 * 7/2004 Covey .................. H01J 49/049
                                                    250/288
(Continued)

FOREIGN PATENT DOCUMENTS

JP    H11-281622 A    5/2002
JP    2005-026159 A    1/2005
(Continued)

OTHER PUBLICATIONS

First Office Action dated Feb. 25, 2025 issued for the corresponding Japanese Patent Application No. 2023-543516.
(Continued)

*Primary Examiner* — Andrew Smyth
(74) *Attorney, Agent, or Firm* — Muir Patent Law, PLLC

(57)    ABSTRACT

An ionizer disposed in an ionization chamber separated from an analysis chamber by a partition provided with an ion introduction port, the ionizer including: an electrospray ionization probe 111 configured to charge and nebulize a liquid sample as charged droplets, the electrospray ionization probe being disposed such that a nebulization axis is orthogonal to a central axis of the ion introduction port; and a heated gas supply mechanism configured to blow a heated gas to a position between a tip of the electrospray ionization probe and an intersection point X of the nebulization axis and the central axis, where the position is separated from the tip by a predetermined distance or more.

5 Claims, 3 Drawing Sheets

| | | EXAMPLE | COMPARATIVE EXAMPLE 1 | COMPARATIVE EXAMPLE 2 | COMPARATIVE EXAMPLE 3 | COMPARATIVE EXAMPLE 4 | COMPARATIVE EXAMPLE 5 |
|---|---|---|---|---|---|---|---|
| ARRANGEMENT | θ (DEGREE) | 70 | 70 | 90 | 90 | 110 | 110 |
| | L(mm) | 9.0 | 15.0 | 9.0 | 15.0 | 9.0 | 15.0 |
| ION STRENGTH (a.u.) | Reserpine | 18,865,531 | 11,096,621 | 5,019,379 | 3,339,345 | 5,849,929 | 4,048,095 |
| | Testosterone | 458,494 | 184,985 | 68,823 | 53,280 | 48,729 | 38,581 |
| | Chlorsulfuron | 1,447,554 | 1,152,061 | 875,218 | 606,804 | 720,077 | 437,869 |

(56) References Cited

U.S. PATENT DOCUMENTS

| | | |
|---|---|---|
| 2014/0131570 A1 | 5/2014 | Yoshioka et al. |
| 2015/0380226 A1 | 12/2015 | Fukui et al. |
| 2018/0374694 A1 | 12/2018 | Fukui et al. |
| 2020/0041471 A1 | 2/2020 | Ueda |

FOREIGN PATENT DOCUMENTS

| | | | |
|---|---|---|---|
| JP | 2013-007639 A | 1/2013 | |
| JP | 2011-133245 B | 2/2014 | |
| JP | 2016-011847 A | 1/2016 | |
| WO | WO-2017104053 A1 * | 6/2017 | .............. H01J 49/24 |
| WO | WO-2018100612 A1 * | 6/2018 | ........... G01N 30/726 |

OTHER PUBLICATIONS

Second Office Action dated Jul. 15, 2025 issued for the corresponding Japanese Patent Application No. 2023-543516.
Written Opinion of the International Searching Authority (ISA237) dated Nov. 16, 2021, for application No. PCT/JP2021/030953.
Notice of Rejection dated Dec. 2, 2025 issued for the corresponding Japanese Patent Application No. 2023-543516.

* cited by examiner

CID GAS

CONTROL/PROCESSING
UNIT

| | | EXAMPLE | COMPARATIVE EXAMPLE 1 | COMPARATIVE EXAMPLE 2 | COMPARATIVE EXAMPLE 3 | COMPARATIVE EXAMPLE 4 | COMPARATIVE EXAMPLE 5 |
|---|---|---|---|---|---|---|---|
| ARRANGEMENT | $\theta$ (DEGREE) | 70 | 70 | 90 | 90 | 110 | 110 |
| | L(mm) | 9.0 | 15.0 | 9.0 | 15.0 | 9.0 | 15.0 |
| ION STRENGTH (a.u.) | Reserpine | 18,865,531 | 11,096,621 | 5,019,379 | 3,339,345 | 5,849,929 | 4,048,095 |
| | Testosterone | 458,494 | 184,985 | 68,823 | 53,280 | 48,729 | 38,581 |
| | Chlorsulfuron | 1,447,554 | 1,152,061 | 875,218 | 606,804 | 720,077 | 437,869 |

Fig.5

DISTANCE L FROM PROBE TIP TO HEATED GAS BLOWING POSITION [mm]

IONIZER

TECHNICAL FIELD

The present invention relates to an ionizer.

BACKGROUND ART

In order to measure a target component contained in a liquid sample, a liquid chromatograph mass spectrometer is widely used. In measurement of a target component using a liquid chromatograph mass spectrometer, a liquid sample is introduced into a liquid chromatograph, the target component is separated by a column of the liquid chromatograph, and then the target component is introduced into the mass spectrometer. In the mass spectrometer, a target component contained in a liquid sample is ionized by, for example, an electro spray ionization (ESI) source, and generated ions are separated and detected according to a mass-to-charge ratio.

The ESI source is equipped with an ESI probe including a capillary through which a liquid sample flows and to which a high voltage is applied, and a nebulizer gas channel provided on an outer periphery of the capillary. In the ESI probe, the liquid sample flowing in the capillary is charged by the high voltage and transported to the tip of the ESI probe, and the nebulizer gas is blown at the tip to nebulize the liquid sample into an ionization chamber as charged droplets. The nebulized charged droplets are further micronized in the ionization chamber by repeating a process in which the surface electric field increases with evaporation (desolvation) of the solvent and are split by repulsion between charges, and are finally ionized. Ions generated in the ionization chamber are drawn into a mass spectrometry chamber from an ion introduction port provided in a partition between the ionization chamber and the mass spectrometry chamber by a pressure difference between the ionization chamber having a substantially atmospheric pressure and the mass spectrometry chamber which is a vacuum chamber located at a subsequent stage of the ionization chamber. In order to promote desolvation in such an ionization process, Patent Literatures 1 and 2 describe an ionizer including a mechanism for blowing a heated gas to charged droplets in addition to the ESI probe.

CITATION LIST

Patent Literature

Patent Literature 1: U.S. Pat. No. 5,412,208 A
Patent Literature 2: U.S. Pat. No. 6,759,650 B

SUMMARY OF INVENTION

Technical Problem

In Patent Literatures 1 and 2, heated gas is blown around the tip of an ESI probe, and this enables efficient heating of the charged droplets immediately after nebulized from the probe. On the other hand, there is a problem that the liquid sample flowing through the capillary in the ESI probe is also heated and may be boiled, which renders nebulization from the ESI probe destabilized, and the ion measurement sensitivity unstable.

An object of the present invention is to promote desolvation of a liquid sample by an electrospray ionization method without destabilizing ionization efficiency of a target component in an ionizer that ionizes the target component contained in the liquid sample.

Solution to Problem

The present invention made to solve the above problem is an ionizer disposed in an ionization chamber separated from an analysis chamber by a partition provided with an ion introduction port, the ionizer including:
  an electrospray ionization probe configured to charge and nebulize a liquid sample as charged droplets, the electrospray ionization probe being disposed such that a nebulization axis is orthogonal to a central axis of the ion introduction port; and
  a heated gas supply mechanism configured to blow a heated gas to a position between a tip of the electrospray ionization probe and an intersection point of the nebulization axis and the central axis, the position being separated from the tip by a predetermined distance or more.

Advantageous Effects of Invention

In the ionizer according to the present invention, a heated gas is blown onto the charged droplets that have been micronized while flying for a predetermined distance or more after being nebulized from the tip of an electrospray ionization (ESI) probe. Therefore, solvent molecules contained in the charged droplets quickly dissociate, and desolvation is promoted. In addition, since the heated gas is blown to a position separated from the tip of the ESI probe, the liquid sample does not boil while passing through the capillary in the ESI probe, and desolvation from the charged droplets is promoted. That is, the predetermined distance is a distance at which the heated gas is not directly blown onto the ESI probe in consideration of the spread of the flow of the heated gas blown out from the heated gas supply mechanism. When ions generated by blowing the heated gas approach the central axis, the ions are drawn into the analysis chamber from the ion introduction port by a pressure difference between the ionization chamber and the analysis chamber. Furthermore, since the heated gas is blown before the charged droplets nebulized from the tip of the ESI probe reach the ion introduction port, it is suppressed that the charged droplets enter the analysis chamber from the ion introduction port in a droplet state. In addition, by supplying the heated gas to such a position, it is also suppressed that impurities other than ions generated from the liquid sample (undesired neutral molecules or ions existing in the ionization chamber) enter the analysis chamber from the ion introduction port. Therefore, contamination of the ion introduction port and the analysis chamber is suppressed, and the robustness of the device is improved.

BRIEF DESCRIPTION OF DRAWINGS

FIG. 5 is a diagram for explaining another measurement result using the ionizer of the present embodiment.

DESCRIPTION OF EMBODIMENTS

Figure 1:
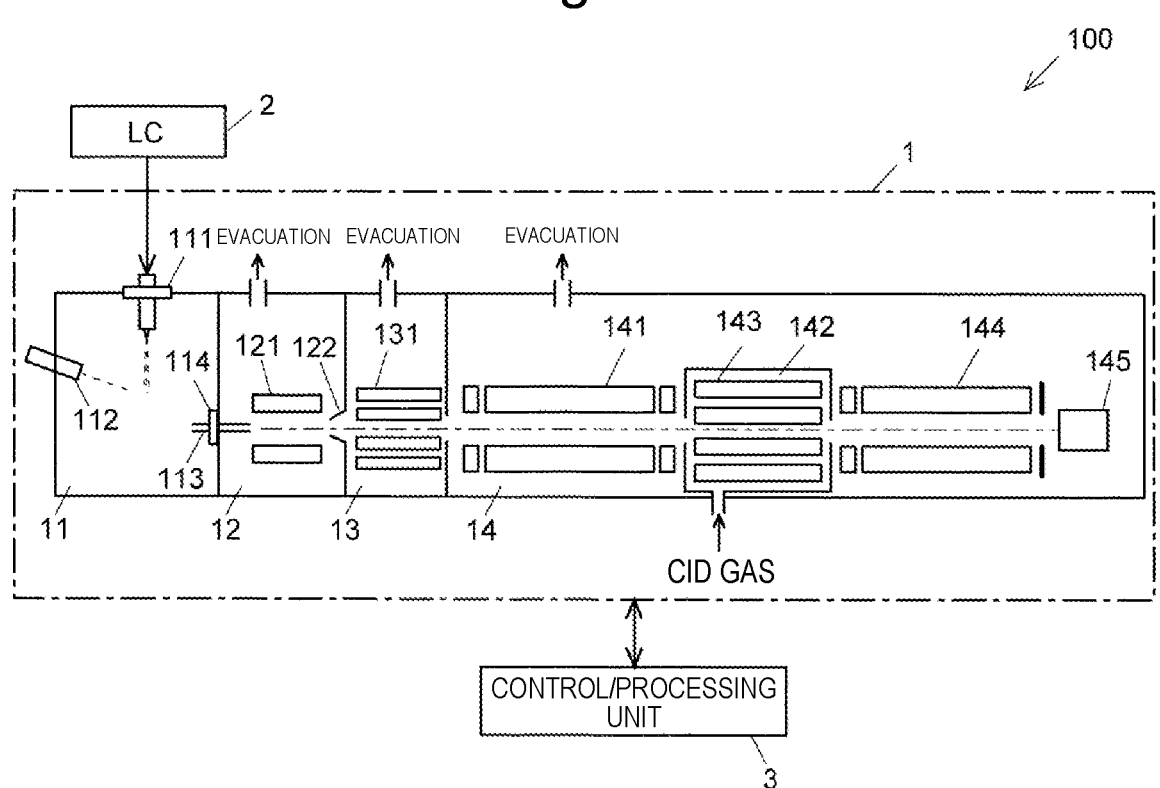
FIG. 1 is a schematic configuration diagram of a liquid chromatograph mass spectrometer in which a mass spectrometer including an embodiment of an ionizer according to the present invention is combined with a liquid chromatograph.

An embodiment of an ionizer according to the present invention will be described below with reference to the drawings. FIG. 1 is a schematic configuration diagram of a liquid chromatograph mass spectrometer 100 including an ionizer of the present embodiment.

The liquid chromatograph mass spectrometer 100 of the present embodiment roughly includes a liquid chromatograph 2, a mass spectrometer 1, and a control/processing unit 3 that controls each unit of the liquid chromatograph 2 and the mass spectrometer 1.

The mass spectrometer 1 includes an ionization chamber 11 at substantially atmospheric pressure and a vacuum chamber whose inside is evacuated by a vacuum pump (not illustrated). The inside of the vacuum chamber is separated into a first intermediate vacuum chamber 12, a second intermediate vacuum chamber 13, and an analysis chamber 14, and has a configuration of a differential exhaust system with which the degree of vacuum increases in this order. The ionization chamber 11 and the first intermediate vacuum chamber 12 communicate with each other by a desolvation tube 113 provided in a partition separating the ionization chamber 11 and the first intermediate vacuum chamber 12. The first intermediate vacuum chamber 12 and the second intermediate vacuum chamber 13 communicate with each other through an opening at the top of a skimmer 122 provided in a partition separating the first intermediate vacuum chamber 12 and the second intermediate vacuum chamber 13. The second intermediate vacuum chamber 13 and the analysis chamber 14 communicate with each other through an opening provided in a partition separating the second intermediate vacuum chamber 13 and the analysis chamber 14.

In the ionization chamber 11, an electrospray ionization (ESI) probe 111 and a heated gas supply probe 112 are disposed. A liquid sample is introduced into the ESI probe 111 directly or after component separation by a column of a liquid chromatograph. The heated gas supply probe 112 blows a heated gas to the charged droplets nebulized from the ESI probe 111. As the heated gas, for example, nitrogen gas is used.

Figure 2:
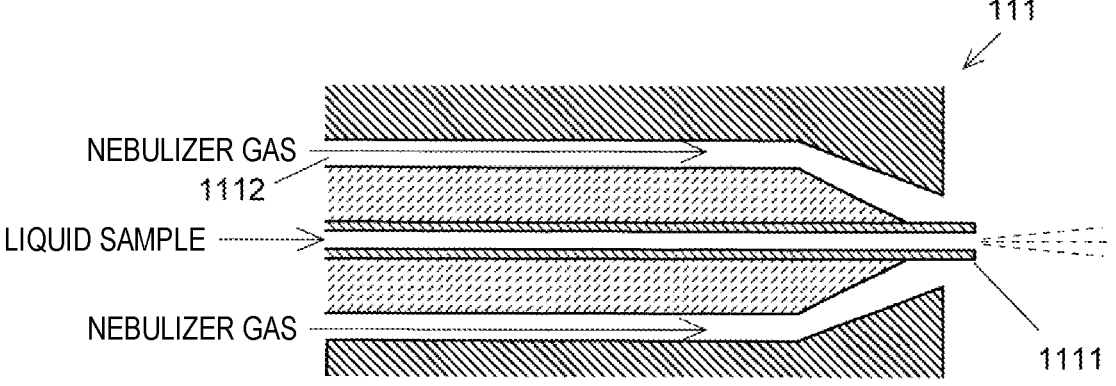
FIG. 2 is an enlarged view of a tip portion of an ESI probe of the ionizer of the present embodiment.

As illustrated in a partially enlarged view of the tip portion in FIG. 2, the ESI probe 111 includes a capillary 1111 through which a liquid sample flows and a nebulizer gas channel 1112 provided outside the capillary 1111. In the ESI probe 111, the liquid sample flowing in the capillary 1111 is charged by the high voltage (ESI voltage) and transported to the tip of the ESI probe 111, and the nebulizer gas is blown at the tip to nebulize the liquid sample into the ionization chamber 11 as charged droplets. The charged droplets nebulized into the ionization chamber 11 are micronized by repeating a process in which a surface electric field increases with evaporation (desolvation) of a solvent and is split by repulsion between charges, and are finally ionized. In addition, desolvation is promoted by blowing the heated gas from the heated gas supply probe 112 onto the charged droplets. The ions generated in the ionization chamber 11 are drawn into the first intermediate vacuum chamber 12 from the desolvation tube 113 due to a pressure difference with the first intermediate vacuum chamber 12 located at a subsequent stage of the ionization chamber 11. The desolvation tube 113 is heated by a heating block 114 constituting a part of the partition, and desolvation is further promoted during passage through the desolvation tube 113. The heating block 114 is heated by energization to a heater (not illustrated) or the like.

An ion guide 121 including a plurality of rod-shaped electrodes is disposed in the first intermediate vacuum chamber 12. The ions introduced through the desolvation tube 113 are converged in the vicinity of the ion optical axis (the central axis in the flight direction of the ions) C by the ion guide 121, and enter the second intermediate vacuum chamber 13 through the opening at the top of the skimmer 122.

An ion guide 131 including a plurality of rod-shaped electrodes is disposed in the second intermediate vacuum chamber 13. The ions introduced through the opening at the top of the skimmer 122 are converged in the vicinity of the ion optical axis C by the ion guide 131, and enter the analysis chamber 14 through the opening provided in the partition separating the second intermediate vacuum chamber 13 and the analysis chamber 14.

In the analysis chamber 14, a front quadrupole mass filter 141, a collision cell 142, a rear quadrupole mass filter 144, and an ion detector 145 are disposed. Each of the front quadrupole mass filter 141 and the rear quadrupole mass filter 144 includes a main rod, a pre-rod located at a preceding stage of the main rod, and a post-rod located at a subsequent stage of the main rod. In the collision cell 142, a multipole rod electrode 143 that converges ions in the collision cell 142 to the vicinity of the ion optical axis C is disposed. In addition, the collision cell 142 is provided with a collision induced dissociation (CID) gas introduction portion for introducing an inert gas such as nitrogen gas as CID gas.

Among the ions that have entered the analysis chamber 14, ions having a predetermined mass-to-charge ratio are selected as precursor ions by the front quadrupole mass filter 141, and enter the collision cell 142. Inside the collision cell 142, precursor ions are cleaved by collision with the CID gas to generate product ions. The ions generated in the collision cell 142 are subjected to mass separation by the rear quadrupole mass filter 144 and detected by the ion detector 145. The output signal from the ion detector 145 is sequentially transmitted to the control/processing unit 3. The control/ processing unit 3 creates a mass spectrum on the basis of the output signal from the ion detector 145.

The mass spectrometer 1 of the present embodiment can perform MS scan measurement, selected ion monitoring (SIM) measurement, product ion scan (MS/MS scan) measurement, multiple reaction monitoring (MRM) measurement, and the like. In the MS scan measurement, the front quadrupole mass filter 141 does not select ions (does not function as a mass filter), and the mass-to-charge ratio of ions to be allowed to pass through the rear quadrupole mass filter 144 is scanned to detect ions by the ion detector 145. In the SIM measurement, the ions are not selected by the front quadrupole mass filter 141, the mass-to-charge ratio of the ions to be allowed to pass through the rear quadrupole mass filter 144 is fixed to detect ions by the ion detector 145.

On the other hand, in the MS/MS scan measurement and the MRM measurement, both the front quadrupole mass filter 141 and the rear quadrupole mass filter 144 are caused to function as mass filters, and only ions having a mass-to-charge ratio set as precursor ions are allowed to pass through the front quadrupole mass filter 141. In addition, a CID gas is supplied into the collision cell 142, and the precursor ions are cleaved to generate product ions. In the MS/MS scan measurement, the mass-to-charge ratio of ions to be allowed to pass through the rear quadrupole mass filter 144 is scanned to detect ions by the ion detector 145. In the MRM measurement, the mass-to-charge ratio of ions to be allowed to pass through the rear quadrupole mass filter 144 is fixed to detect ions by the ion detector 145.

Figures 3, 4:
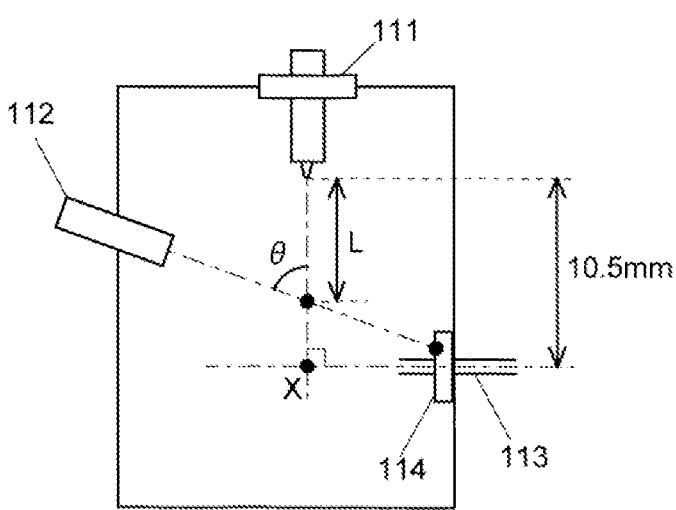
FIG. 3 is a diagram for explaining parameters related to the arrangement for the ionizer of the present embodiment.
FIG. 4 is a measurement result using an ionizer with the arrangement of Example and an ionizer with the arrangement of Comparative Example.

The mass spectrometer 1 of the present embodiment is characterized by the arrangement of each unit in the ionization chamber 11. Hereinafter, the configuration of the ionization chamber 11 will be described. FIG. 3 is an enlarged view of the ionization chamber 11 of the mass spectrometer 1.

The ESI probe 111 is disposed such that its nebulization axis (the central axis in the traveling direction of charged droplets nebulized from the ESI probe 111) and the central axis of the desolvation tube 113 are orthogonal to each other at an intersection point X. In the present embodiment, as a most preferable mode, the nebulization axis of the ESI probe 111 is configured to be in the vertical direction, and the central axis of the desolvation tube 113 is configured to be in the horizontal direction. In addition, the heated gas supply probe 112 is disposed such that an angle θ formed by the blowing direction of the heated gas supply probe 112 (the central axis in the traveling direction of the heated gas) and the nebulization axis of the ESI probe 111 is 60 degrees or more and 80 degrees or less. The desolvation tube 113, which is a capillary provided on the partition of the ionization chamber 11 and the first intermediate vacuum chamber 12, is heated to a predetermined temperature by the heating block 114 constituting a part of the partition.

In addition, the heating block 114 is disposed such that an upper portion (a portion positioned above the desolvation tube 113) of the heating block is positioned in a blowing direction of the heated gas supply probe 112. That is, the heated gas supplied from the heated gas supply probe 112 is blown to the charged droplets at a position between the tip of the ESI probe 111 and the intersection point X of the nebulization axis of the ESI probe 111 and the central axis of the desolvation tube 113. In the present embodiment, since the heated gas is blown until the charged droplets nebulized from the tip of the ESI probe 111 reaches the desolvation tube 113, it is suppressed that the charged droplets enter the analysis chamber 14 side (first intermediate vacuum chamber 12, second intermediate vacuum chamber 13, and analysis chamber 14) from the desolvation tube 113 in a droplet state. In addition, by supplying the heated gas to such a position, it is also suppressed that things other than ions generated from the liquid sample (undesired neutral molecules and ions existing in the ionization chamber 11) enter the analysis chamber 14 side through the desolvation tube 113. As a result, contamination of each chamber on the analysis chamber side is suppressed, and the robustness of the mass spectrometer 1 is improved.

The above arrangement is based on the results of measurements made by the inventors to study the optimal arrangement of the ESI probe 111 and the heated gas supply probe 112. Hereinafter, the measurement will be described.

In this measurement, using the liquid chromatograph mass spectrometer 100 of the above embodiment and using a distance L from the tip of the ESI probe 111 to the intersection of the nebulization axis of the ESI probe 111 and the blowing direction of the heated gas supply probe 112 (that is, the flight distance until the charged droplets blown from the ESI probe 111 are heated) and the angle θ as parameters (see FIG. 3), in the arrangement of Example and Comparative Example 1 to 5 (see FIG. 4) having different combinations of these values, MRM measurement was performed on reserpine ($C_{33}H_{40}N_2O_9$, MRM transition: 609.3>195.1), testosterone ($C_{19}H_{28}O_2$, MRM transition: 289.2>97.1), and chlorsulfuron ($C_{12}H_{12}ClN_5O_4S$, MRM transition: 358.2>167.1) contained in the liquid sample.

The difference between the height of the tip position of the ESI probe 111 and the height of the central axis of the desolvation tube 113 (distance in a direction parallel to the nebulization axis of the ESI probe) was set to 10.5 mm, the distance between the tip of the ESI probe 111 and the tip of the heated gas supply probe 112 in the horizontal direction (direction parallel to the central axis of the desolvation tube 113) was set to 10 mm, and the distance between the tip of the ESI probe 111 and the inlet end of the desolvation tube 113 in the horizontal direction was set to 0 mm (that is, the same position). Note that, in FIGS. 1 and 3, the tip of the ESI probe 111 and the position of the desolvation tube 113 in the horizontal direction are shifted in order to clearly illustrate the intersection point X. That is, in Example and Comparative Examples 2 and 4, the heated gas was blown onto the charged droplets nebulized from the ESI probe 111 at a position higher than the central axis of the desolvation tube 113 (a position between the tip of the ESI probe 111 and the intersection point of the nebulization axis of the ESI probe 111 and the central axis of the desolvation tube 113), and in Comparative Examples 1, 3, and 5, the heated gas was blown onto the charged droplets blown from the ESI probe at a position lower than the central axis of the desolvation tube 113 (on the side opposite to the ESI probe 111).

In this measurement, a mixed solution of water and acetonitrile (water:acetonitrile=3:7) was used as a mobile phase of the liquid chromatograph 2, and the liquid was fed at a flow rate of 0.2 ml/min. In addition, in the ESI probe 111, nitrogen gas was supplied at a flow rate of 3 L/min as a nebulizer gas for nebulizing the liquid sample, and a voltage of 3 kV (ESI voltage) was applied to charge the liquid sample. Dry air heated to 400° C. was supplied from the heated gas supply probe 112 at a flow rate of 5.0 L/min. The desolvation tube 113 was heated to 300° C. These measurement conditions are common to Example and Comparative Examples.

FIG. 4 shows the measured strength of each substance in each arrangement. As shown in FIG. 4, for all three kinds of substances, the measured strength in the arrangement of Example was higher than that in the arrangement of Comparative Examples 1 to 3. From the results of Example and Comparative Example 1, it was found that the measured strength of ions was increased (measurement sensitivity was improved) by blowing the heated gas to the charged droplets nebulized from the ESI probe 111 at a position higher than the central axis of the desolvation tube 113 (a position between the tip of the ESI probe 111 and the intersection point of the nebulization axis of the ESI probe 111 and the central axis of the desolvation tube 113). In addition, from the results of Example and Comparative Examples 2 and 4, it was found that the angle θ formed by the nebulization axis of the ESI probe 111 and the blowing direction of the heated gas supply probe 112 is optimally 70 degrees, and if the angle θ is 90 degrees or more, the measured strength (sensitivity) of ions decreases. Note that, if the angle θ formed by the nebulization axis of the ESI probe 111 and the blowing direction of the heated gas supply probe 112 is smaller than 60 degrees, the tip of the ESI probe 111 and the heated gas supply probe 112 come close to each other, and physically interfere with each other, so that it may be difficult to dispose them. In addition, there is a high possibility that discharge occurs. On the other hand, if the angle θ exceeds 80 degrees, the heated gas is blown to the vicinity of the tip of the ESI probe 111, and there is a possibility that the liquid sample flowing through the capillary in the ESI probe 111 is boiled. For these reasons, it is preferable that the angle θ formed by the nebulization axis of the ESI probe 111 and the blowing direction of the heated gas supply probe 112 is in the range of 60 degrees or more and 80 degrees or less.

Next, the measured strength of ions was measured while the distance L from the tip of the ESI probe 111 to the intersection of the nebulization axis of the ESI probe 111 and the blowing direction of the heated gas supply probe 112 (that is, the flight distance until the charged droplets nebulized from the ESI probe 111 are heated) was changed between 2.5 mm and 9.0 mm. In this measurement, the angle θ formed by the nebulization axis of the ESI probe 111 and the blowing direction of the heated gas supply probe 112 was set to 70 degrees, and the reserpine contained in the liquid sample was measured. The types and flow rates of the mobile phase, the nebulizer gas, and the heated gas and the temperature of the desolvation tube 113 are the same as those in the above measurement.

Figure 5:
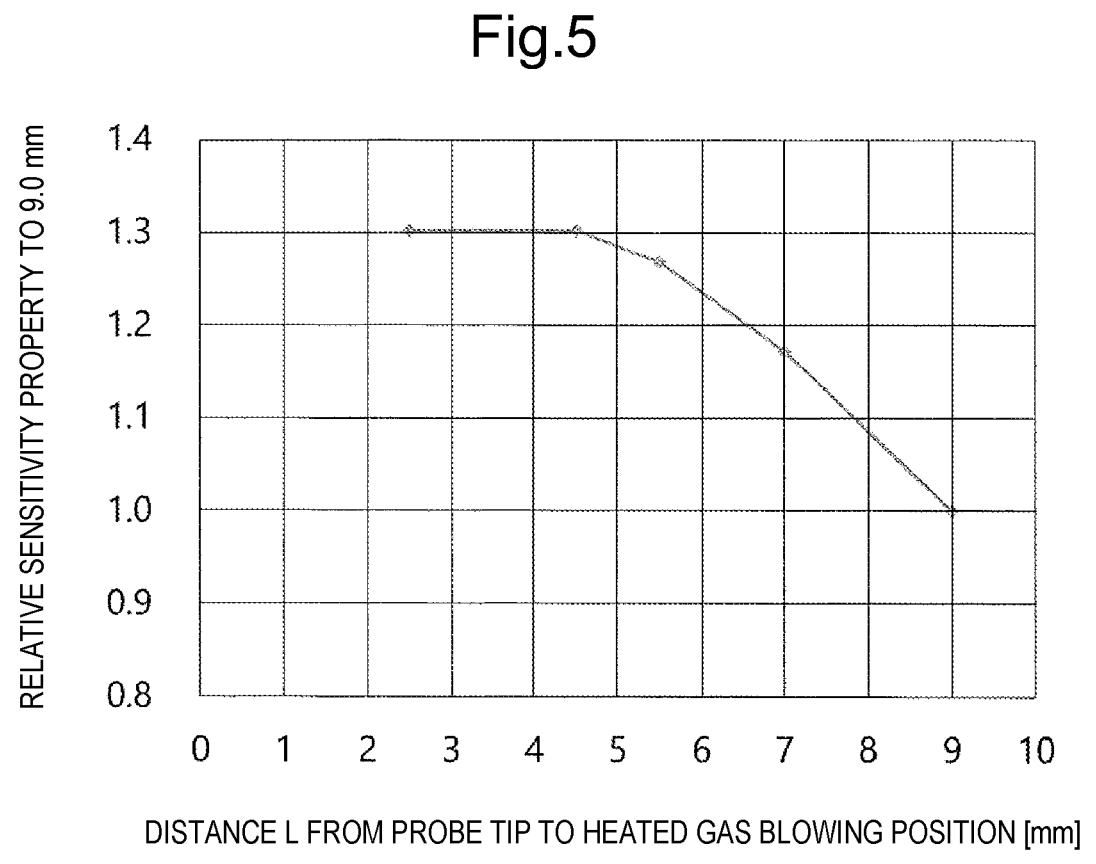

FIG. 5 shows a measurement result. In this measurement, when the distance L was 4.5 mm or more, the measured strength of ions increased as the distance L was shortened, and the measured strength was the same in the range of 2.5 mm or more and 4.5 mm. If the distance L is less than 2.5 mm, the heated gas from the heated gas supply probe 112 is also blown to the tip portion of the ESI probe 111, and there is a possibility that the liquid sample flowing through the ESI probe is boiled. This problem can be avoided if the heated gas blown out from the heated gas supply probe 112 is narrowed, but nevertheless, if this distance L is reduced, there is a possibility that the tip of the ESI probe 111 and the tip of the heated gas supply probe 112 may come close to each other and discharge may occur. In consideration of these points, it is preferable that the distance L is 2.5 mm or more. In addition, like the ionizer of the present embodiment, an ionizer in which the height of the tip of the ESI probe 111 and the height of the central axis of the desolvation tube 113 are 10.5 mm is widely used in, for example, a single quadrupole mass spectrometer. In the ionizer having this configuration, in order to blow the heated gas to the charged droplets at a position higher than the central axis of the desolvation tube 113, it is preferable that the distance L is 10.0 mm or less (at a position higher by 0.5 mm or more than the central axis of the desolvation tube 113). That is, it is preferable that the distance L is 2.5 mm or more and 10 mm or less. Note that, in a triple quadrupole mass spectrometer, an ionizer in which the height of the tip of the ESI probe 111 and the height of the central axis of the desolvation tube 113 are 15.5 mm is also used. In the case of using an ionizer in which the height of the tip of the ESI probe 111 is different from the above, the intersection of the nebulization axis of the ESI probe 111 and the blowing direction of the heated gas supply probe 112 may be at a position 0.5 mm or more above the central axis of the desolvation tube 113.

In the ionizer of the above embodiment, the heated gas supply probe 112 is disposed such that the heating block 114 (above the desolvation tube 113 in the heating block 114) is positioned in the blowing direction of the heated gas from the heated gas supply probe 112. By adopting such a configuration, since the heating block 114 is heated by the heated gas from the heated gas supply probe 112, the amount of power supplied to the heater or the like for heating the heating block 114 can be reduced.

The above-described embodiment and measurement example are merely an example, and can be appropriately modified in accordance with the spirit of the present invention. In the above embodiment, the liquid chromatograph mass spectrometer is used, but the liquid sample can be directly introduced into the ESI probe without including the liquid chromatograph. In addition, in the above embodiment, the generated ions are subjected to mass spectrometry, but the same ionizer as in the above embodiment can also be used in an apparatus that performs other measurements such as ion mobility measurement. Furthermore, also in the case of performing mass spectrometry, mass spectrometry units (single quadrupole type, ion trap type, time-of-flight type, etc.) having various configurations other than the triple quadrupole type of the above embodiment can be used.

Modes

It is understood by those skilled in the art that the plurality of exemplary embodiments described above are specific examples of the following modes.

Clause 1

One mode of the present invention is an ionizer disposed in an ionization chamber separated from an analysis chamber by a partition provided with an ion introduction port, the ionizer including:

an electrospray ionization probe configured to charge and nebulize a liquid sample as charged droplets, the electrospray ionization probe being disposed such that a nebulization axis is orthogonal to a central axis of the ion introduction port; and a heated gas supply mechanism configured to blow a heated gas to a position between a tip of the electrospray ionization probe and an intersection point of the nebulization axis and the central axis, the position being separated from the tip by a predetermined distance or more.

In the ionizer according to Clause 1, a heated gas is blown onto the charged droplets that have been micronized while flying for a predetermined distance or more after being nebulized from the tip of an electrospray ionization (ESI) probe. Therefore, solvent molecules contained in the charged droplets quickly dissociate, and desolvation is promoted. In addition, since the heated gas is blown to a position separated from the tip of the ESI probe, the liquid sample does not boil while passing through the capillary in the ESI probe, and desolvation from the charged droplets is promoted. That is, the predetermined distance is a distance at which the heated gas is not directly blown onto the ESI probe in consideration of the spread of the flow of the heated gas blown out from the heated gas supply mechanism. When the ions generated by blowing the heated gas approach the central axis, the ions are drawn into the analysis chamber from the ion introduction port by a pressure difference between the ionization chamber and the analysis chamber. Furthermore, the position where the heated gas is blown onto the charged droplets by the heated gas supply mechanism is located between the tip of the ESI probe and the intersection of the nebulization axis on which the ESI probe nebulizes the charged droplets and the central axis of the ion introduction port, and the heated gas is blown before the charged droplets nebulized from the tip of the ESI probe reach the ion introduction port, so that the charged droplets are prevented from entering the analysis chamber from the ion introduction port in a droplet state. In addition, by supplying the heated gas to such a position, it is also suppressed that impurities other than ions generated from the liquid sample (undesired neutral molecules or ions existing in the ionization chamber) enter the analysis chamber from the ion introduction port. Therefore, contamination of the ion introduction port and the analysis chamber is suppressed, and the robustness of the device is improved.

Clause 2

In the ionizer according to Clause 1, the central axis of the ion introduction port is a horizontal axis, and the tip of the electrospray ionization probe is disposed above the ion introduction port, and the charged droplets are nebulized downward from the tip.

In the ionizer according to Clause 2, since the charged droplets are nebulized downward from the electrospray ionization probe without defying gravity, the nebulization direction of the charged droplets does not greatly change even when conditions such as the feeding amount of the nebulizer gas are different, and the blowing position of the heated gas is constant. Therefore, desolvation and ionization can be stably and reliably promoted. In addition, in the ionizer according to Clause 2, the heated gas is blown to the charged droplets traveling downward at a position above the ion introduction port, so that it is further suppressed that the charged droplets reach the ion introduction port in a droplet state and the analysis chamber is contaminated, and the robustness of the ionizer is further improved.

Clause 3

In the ionizer according to Clause 1 or 2, an angle formed by the nebulization axis and a blowing direction of the heated gas is 60 degrees or more and 80 degrees or less.

In the ionizer according to Clause 3, since the angle is 60 degrees or more, the tip of the ESI probe and the probe that blows the heated gas do not physically interfere with each other, and it is easy to dispose the ESI probe and the probe that blows the heated gas. In addition, since the angle is 80 degrees or less, it is possible to reduce the possibility that the heated gas is blown to the tip portion of the ESI probe and the liquid sample boils in the ESI probe.

Clause 4

In the ionizer according to any one of Clause 1 to Clause 3, a distance from the tip of the electrospray ionization probe to an intersection of the nebulization axis and a blowing direction of the heated gas is 2.5 mm or more and 10 mm or less.

In the ionizer according to Clause 4, by setting the distance to 2.5 mm or more, the possibility that discharge occurs due to proximity between the tip of the ESI probe and the tip of the heated gas supply probe can be reduced. In addition, by setting the distance to 10 mm or less, in a widely used general ionizer in which the height of the tip of the ESI probe and the height of the central axis of the desolvation tube are 10.5 mm, a heated gas is blown onto the charged droplets at a position above the central axis of the desolvation tube to promote desolvation, and the ion measurement sensitivity can be enhanced.

Clause 5

In the ionizer according to any one of Clause 1 to Clause 4, the ion introduction port is an inlet of a desolvation tube heated by a heating member constituting a part of the partition, and the heated gas supply mechanism is configured to blow the heated gas to the heating member.

In the ionizer according to Clause 5, the heating member block is heated by the heated gas that promotes desolvation, so that power consumption for heating the heating member can be suppressed.

REFERENCE SIGNS LIST

1 . . . Mass Spectrometer
11 . . . Ionization Chamber
111 . . . Electrospray Ionization (ESI) Probe
112 . . . Heated Gas Supply Probe
113 . . . Desolvation Tube
114 . . . Heating Block
12 . . . First Intermediate Vacuum Chamber
121 . . . Ion Guide
122 . . . Skimmer
13 . . . Second Intermediate Vacuum Chamber
131 . . . Ion Guide
14 . . . Analysis Chamber
141 . . . Front Quadrupole Mass Filter
142 . . . Collision Cell
143 . . . Multipole Rod Electrode
144 . . . Rear Quadrupole Mass Filter
145 . . . Ion Detector
2 . . . Liquid Chromatograph
3 . . . Control/Processing Unit
C . . . Ion Optical Axis
L . . . Distance from Tip of ESI Probe to Intersection of Nebulization Axis of ESI Probe and Blowing Direction of Heated Gas Supply Probe
$\theta$ . . . Angle Formed by Nebulization Axis of ESI Probe and Blowing Direction of Heated Gas Supply Probe

The invention claimed is:

1. An ionizer disposed in an ionization chamber separated from an analysis chamber by a partition provided with an ion introduction port, the ionizer comprising:

an ion introduction tube provided in the partition, an inlet of the ion introduction tube being the ion introduction port;

a heating member provided in the partition and configured to heat the ion introduction tube;

an electrospray ionization probe configured to charge and nebulize a liquid sample as charged droplets, the electrospray ionization probe being disposed such that a nebulization axis is orthogonal to a central axis of the ion introduction port; and a heated gas supply mechanism configured to blow a heated gas, from a predetermined direction, to a position between a tip of the electrospray ionization probe and an intersection point of the nebulization axis and the central axis, the position being separated from the tip by a predetermined distance or more, wherein the predetermined direction and the predetermined distance are set such that the heated gas does not reach the electrospray ionization probe, and wherein the heated gas supply mechanism is arranged such that a central axis of a blowing direction of the heated gas passes through the heating member without passing through a portion of the ion introduction tube exposed to the ionization chamber.

2. The ionizer according to claim 1, wherein the central axis of the ion introduction port is a horizontal axis, and the tip of the electrospray ionization probe is disposed above the ion introduction port, and the charged droplets are nebulized downward from the tip.

3. The ionizer according to claim 1, wherein an angle formed by the nebulization axis and a blowing direction of the heated gas is 60 degrees or more and 80 degrees or less.

4. The ionizer according to claim 1, wherein a distance from the tip of the electrospray ionization probe to an intersection of the nebulization axis and a blowing direction of the heated gas is 2.5 mm or more and 10 mm or less.

5. The ionizer according to claim 1, wherein the ion introduction tube is a desolvation tube.

* * * * *